Aug. 7, 1962  R. L. BEURLE  3,048,728
TELEVISION AND LIKE CAMERA TUBES
Filed Aug. 31, 1959

INVENTOR
Raymond Louis Beurle
BY Baldwin & Wight
ATTORNEYS

United States Patent Office 3,048,728
Patented Aug. 7, 1962

3,048,728
TELEVISION AND LIKE CAMERA TUBES
Raymond Louis Beurle, Great Baddow, England, assignor to English Electric Valve Company Limited, London, England, a company of Great Britain
Filed Aug. 31, 1959, Ser. No. 837,190
Claims priority, application Great Britain Sept. 9, 1958
9 Claims. (Cl. 313—65)

This invention relates to television and like camera tubes and more specifically to camera tubes of the kind in which the optical image to be televised is translated into an electrical image by being focussed upon a photo-conductive layer. This photo-conductive layer is commonly deposited inside the front window of the tube envelope, i.e. inside the end of the tube envelope.

Figure 1:
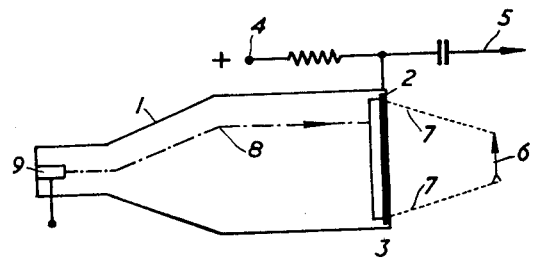
Figure 2:
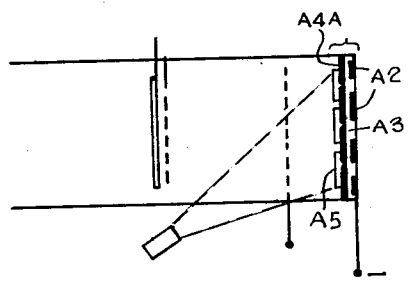
Figure 3:
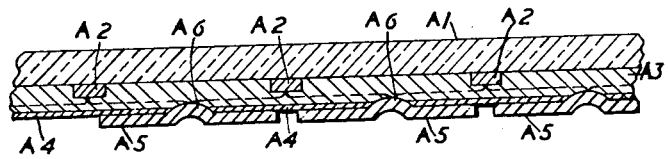

The invention is illustrated in and explained in connection with the accompanying drawings in which FIGURE 1 is a highly simplified schematic representation of a known Vidicon tube and is provided for purposes of explanations; FIGURE 2 is a similarly simplified schematic representation of one form of tube in accordance with this invention; FIGURE 3 is a purely schematic sectional drawing (of course not to scale) of one form of photo-conductive structure which may be used with advantage in a tube in accordance with this invention; and FIGURE 4 similarly shows another form of photo conductive structure which may be used.

FIGURE 1 shows only those parts of a known Vidicon tube which are necessary for the purposes of explaining the present invention. Referring to FIGURE 1 the tube has deposited inside one end wall of its envelope 1 a very thin transparent conducting plate 2 (normally a thin layer of tin oxide) on which is deposited a photo-conductive layer 3. Owing to the extreme difficulty of representing the very thin plate 2 or the photo-conductive layer 3 even approximately to scale in a drawing of convenient size, the plate 2 is represented as a thick black line and the photo-conductive layer 3 as a rectangle on one side of that line. The plate 2 is held at positive potential from a suitable source connected at the terminal 4 and output potentials are taken off to an output circuit 5. The picture to be televised, represented by an arrow 6, is optically focused as indicated by the dotted lines 7 upon the photo-conductive layer 3 through the plate 2. Once during each television frame period (normally, with present-day British television practice, 1/25 of a second) an electron beam from a gun 9 and represented by the chain line 8 scans across the surface of the photo-conductive layer 3 restoring the potential of its surface approximately to the potential of the cathode of the gun 9. The photo-conductor becomes electrically conducting wherever light falls upon it and therefore, in the period between successive scans by the electron beam, the different elemental points on the surface of the photo-conductive layer charge up in a positive direction towards the potential of the plate 2 and to an extent depending upon the light intensity at each point. As stated, each scanning by the electron beam returns the surface of the photo conductive layer to the cathode potential of the gun thus re-establishing full potential difference across the photo-conductor layer. Accordingly picture signals corresponding to the optical image of the scene 6 appear on the output lead 5. Means (normally constituted by focussing solenoids) for focussing the electron beam, means for producing scanning action thereof, and other necessary electrodes in the tube are all provided as well known per se but are not shown in FIGURE 1 in order that that figure may be as simple as possible.

It is essential for efficient operation of a camera tube as shown in the said FIGURE 1 that the electrical leakage through the photo-conductor shall be small in order that the potential difference across the photo-conductive layer shall not be seriously reduced by leakage during one television frame period. This, of course, involves that the electrical time constant of the photo-conductive layer or, what amounts to the same thing, the electrical time constant of the photo-conductive material, must be large in relation to the frame period, i.e. considerably longer than 1/25 of a second to take normal present-day British practice as an example. It is, however, characteristic of photo-conductive materials that their current-light sensitivity (e.g. in micro-amperes per lumen) is related to their electrical conductivity. More specifically, if the time constant of the photo-conductive response is less than the electrical time constant of the material then the maximum obtainable quantum efficiency of the photo-conductor tends to be below unity by about the same ratio. Since in a Vidicon tube as exemplified by the said FIGURE 1 it is necessary for the photo-conductive time constant to be short in order that noticeable lag shall not occur, the electrical time constant must be very much greater than the photo-conductive time constant and the quantum efficiency is accordingly correspondingly very poor, being in practice of the order of 1% or so. Although photo-conductive material (such as cadmium sulphide) which can be so prepared as to have an apparent quantum efficiency greater than unity are known and available, they are quite unsuitable for use in a known tube as represented in the said FIGURE 1 because their photo-conductive time constant is longer than the electrical time constant.

As already stated, a low resistivity photo-conductor cannot be used in a known Vidicon tube because the photo-conductive layer is only scanned for a very short time once during each television frame period and therefore the resistivity must be high enough to prevent the potential across the layer leaking away between one scan and the next. If it were possible to take current continuously from the surface of the photo-conductive layer instead of only doing so intermittently as in the known Vidicon tube, a low resistivity photo-conductor could be used with consequent considerable improvement.

According to this invention, a television tube comprises a transparent conductive electrode; a photoconductive layer of low specific resistivity connected to the conductive electrode at a plurality of spaced areas and positioned and adapted to receive, through the conductive electrode, an optical image to be televised; a plurality of photoemissive elements spaced from the photoconductive layer on the side thereof remote from the conductive electrode and positioned and arranged to be substantially uniformly illuminated, the elements being connected to the photoconductive layer at areas none of which is opposite any one of the first-mentioned areas, all the areas being so positioned that the current paths from one side of the photoconductive layer to the other, extend mainly in the plane of the layer and are of substantial length; a control electrode spaced from the elements on the side thereof remote from the photoconductive layer; an external connection to the control whereby the control electrode may be connected to a point of fixed potential; a charge storage target spaced from the control electrode on the side thereof remote from the elements and positioned and arranged to receive electrons from the elements, thereby to produce an electrical charge image corresponding to the original optical image and an electron gun adapted to scan said storage target to develop picture signals. If the photo-conductive layer is of a material which is sensitive to the illumination used to cause emission from the photo-emissive elements an opaque layer is interposed between the photo-emissive elements and the photo-conductive layer.

By the expression "a photo-conductive layer of low specific resistance" is meant one made of a material whose specific resistance is at least one order lower than the specific resistances of the materials normally employed at present for the photo-conductors of Vidicon camera tubes. While it is very difficult to give precise figures for the different specific resistivities of the various forms of thin photo-conductive layers here in question, one of the materials at present in common use in Vidicon camera tubes is antimony trisulphide, which, when in use in such a tube, may be taken as having a specific resistance of the order of $10^{13}$ ohms/cm.$^3$. Examples of materials which may be used in carrying out this invention are cadmium selenide, cadmium sulphide and lead telluride which, when in use in a tube in accordance with this invention may be taken as having a specific resistance many orders of magnitude lower than that of antimony trisulphide. These materials thus have specific resistances several orders lower than that of antimony trisulphide.

The electrical charge image which is scanned by a cathode ray beam to develop picture signals may conveniently be built up on a double-sided target electrode structure of the type ordinarily employed in an Image Orthicon tube and provided, on the side remote from the scanning gun, with a grid or mesh electrode which serves to collect secondary electrons and is, in use, held at fixed potential.

An additional important advantage of the invention is that, owing to the low resistance photo-conductive material which may be employed, a camera tube in accordance with the invention can be satisfactorily employed to televise scenes in infra-red light (i.e. the optical image may be an infra-red image) without visible light at all, i.e. in apparent darkness.

FIGURE 2 represents an embodiment of this invention. In the said FIGURE 2 parts corresponding to those of the known tube of FIGURE 1 of the same specification are indicated by the same references, and again, the figure is simplified by the omission of beam focussing means, scanning means, and additional electrodes not necessary to an understanding of this invention. A photoconductive structure A of FIGURE 2 is shown in more detail in FIGURE 3. The transparent conducting plate 2 is replaced by the grid A2 composed of parallel conductors and which plate is connected to the negative high tension terminal and the photo-conductive layer A3 is a layer of material of low specific resistance, for example, a layer of cadmium sulphide, instead of being a high resistance layer, e.g. a layer of antimony trisulphide as it is in the known tube already described. The electron beam 8 from the gun 9 no longer scans the photo-conductive layer 3. Instead the said layer is on one face of a glass or other suitable opaque insulating plate-like member A4 on the other face of which are discrete opaque metal patches or elements carrying photo-emissive layer for example an antimony-caesium photo-cathode. Referring to FIGURE 3 which shows in detail the photoconductive structure A of FIGURE 1, there is a glass plate A1 which carries a grid A2 composed of parallel conductors represented by the black areas and a photo-conductive layer A3. On the other face of the layer A3 is a thin layer A4 of insulating material with very small holes therethrough, one hole per picture element. On the back of the insulating layer A4 are opaque metal patches or elements A5 having very small projections A6 covered with photoemissive material (not separately shown) and which project through the holes in the insulation A5 to contact with the photoconductive layer A3. It will be seen that the current paths (indicated by the broken lines) through the photoconductive layer are long ones.

Referring again to FIGURE 2, a beam of light from a light source 13 continuously and uniformly illuminates the photo-emissive elements A5. This beam is represented by the dotted lines 14. In front of the photoemissive elements A5 and spaced from them is a grid or mesh 15 which is at anchored potential and provides a substantially equi-potential surface. Beyond the grid or mesh 15 in the direction of the electron gun 9 is a double-sided target electrode structure which may conveniently be of the well known kind as ordinarily employed in image orthicon camera tubes. The target proper is represented in FIGURE 2 by a thick black line 16 and between it and the grid or mesh 15 is a secondary-electron collecting grid 17 which is close to the back of the target and is maintained at a suitable positive potential. The electron beam 8 from the gun 9 scans the target and output picture signals appear on the lead 5.

With this arrangement, when light falls on the photo-conductive layer 3, the potential difference across it tends to diminish and its inner surface tends to become negative. Negative potentials thus produced at different elemental points are fed to corresponding ones of the photoemissive elements A5 which is continuously emitting photo-electrons. Photo-electrons from those elements which have thus become negative pass through the grid 15 to the target where they produce positive charges by secondary emision, the secondary electrons being collected by the grid 17. Where, however, light has not fallen on the photo-conductive layer, the corresponding elements in the photo-emission layer will not be carried negative and the photo-electrons emitted will be turned back by the earthed grid 15 and thus return to the layer 11 instead of landing on the target. Accordingly, an electrical charge image corresponding to the electrical image of the photo-conductive layer 3 is built up on the target and this is scanned off by the cathode ray beam moving in a television raster in the usual way to develop picture signals on the output lead 5. It will be seen that since, with this arrangement, the photo-emissive elements are continuously abstracting energy from the photo-conductive layer, the choice of the material for the photo-conductive layer 3 is no longer limited by considerations of resistivity and may be a material with a high quantum efficiency, e.g. a quantum efficiency of unity or above.

In order to avoid loss of focus due to electrons which have been emitted from the elements A5 but, failing to pass through the mesh 15, return to the these elements, the grid may be placed very close to the photo-cathode or, if this is not convenient, the axial focussing magnetic field (generated by means not shown) may be arranged to focus these returning electrons. If desired an additional grid (not shown) may be interposed between the photo-emissive surface and the equipotential grid or mesh 15 and held at a suitable positive potential to ensure substantially uniform acceleration of all photo-electrons and hence substantially uniform focussing action all over the image.

Referring to FIGURE 3 which shows in detail the photoconductive structure A of FIGURE 1 there is a glass plate A1 which carries a grid A2 composed of parallel conductors represented by the black areas and a photo-conductive layer A3. On the other face of the layer A3 is a thin layer A4 of insulating material with very small holes therethrough, one hole per picture element. On the back of the insulating layer A4 are opaque metal patches or elements A5 having very small projections A6 covered with photo-emissive material (not separately shown) and which project through the holes in the insulation A5 to contact with the photo-conductive layer A3. It will be seen that the current paths (indicated by the broken lines) through the photo-conductive layer are long ones.

Figure 4:
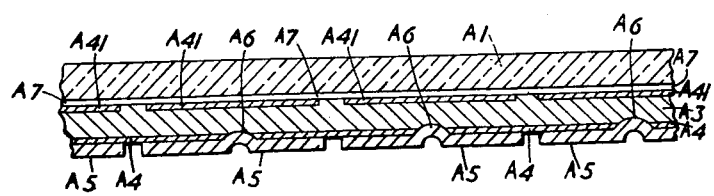

In the modification shown in FIGURE 4 the grid A2 is omitted and, instead, there is a second insulating layer A41 with holes therethrough which are filled by the photo-conductive material of the layer A3. Over the layer A41 and between the same and the glass support A1 is a transparent conducting layer A7 which contacts with the photo-conductive layer where the holes occur. The holes in the two insulating layers are mutually staggered, the holes in one layer being opposite points midway between the holes in the other.

For some purposes—for example for infra-red detection—it may be permissible to use frame periods much shorter than those conventionally employed at present for ordinary television where the conventional (British) frame period is 1/25 of a second. Obviously the shorter the frame period, the less stringent are the requirements as regards electrical leakage. Calculation appears to indicate that, by using a structure as in FIGURE 3 or FIGURE 4, it should be possible, in a television system with 100 lines per picture and 1000 frames per second, to use a photo-conductive material of 2000 ohms/cm.³ in a layer 2µ thick and to have an effective layer resistance of 200 ohms, an effective layer voltage of 1 volt and a current of 5 ma.

The grids and patches of the last described FIGURES 3 and 4 are preferably deposited, e.g. by evaporation of metal in vacuo or they could be formed, for example, by a photo-etch process.

I claim:

1. A television camera tube comprising a transparent conductive electrode; a photoconductive layer of low specific resistivity connected to said conductive electrode at a plurality of space areas and positioned and adapted to receive, through said conductive electrode, an optical image to be televised; a plurality of photoemissive elements spaced from said photoconductive layer on the side thereof remote from said conductive electrode and positioned and arranged to be substantially uniformly illuminated, said elements being connected to said photoconductive layer at areas none of which is opposite any one of said first-mentioned areas, all of said areas being so positioned that the current paths from one side of the photoconductive layer to the other extend mainly in the plane of the layer and are of substantial length; a control electrode spaced from said elements on the side thereof remote from the photoconductive layer; means including a connection to said control electrode for applying a potential thereto; a charge storage target spaced from said control electrode on the side thereof remote from said elements and positioned and arranged to receive electrons from said elements thereby to produce an electrical charge image corresponding to the original optical image and an electron gun adapted to scan said storage target to develop picture signals.

2. A tube as claimed in claim 1 wherein said transparent conductive electrode is a grid and said photoemissive elements comprise conducting patches spaced from said photoconductive layer by an insulating layer having holes therethrough, said patches covering and filling said holes thereby connecting with the photoconductive layer, said holes being staggered with respect to the grid in such manner that no hole is directly opposite any part of the grid.

3. A tube as claimed in claim 1 wherein said transparent conductive electrode is a thin continuous conducting layer superimposed on an insulating layer with holes therethrough, the conducting layer making contact with the photoconductive layer at the holes, and said photoemissive elements comprise conducting patches spaced from said photoconductive layer by a second insulating layer having holes therethrough, said patches covering and filling the holes in said second insulating layer thereby connecting with the photoconductive layer, the holes in the two insulating layers being staggered in relation to one another in such manner that they are not directly opposite one another.

4. A tube as claimed in claim 1 wherein an opaque layer is interposed between the photo-emissive element and the photo conductive element.

5. A tube as claimed in claim 1 wherein the photoconductive layer material is cadmium selenide.

6. A tube as claimed in claim 1 wherein the photoconductive layer material is cadimum sulphide.

7. A tube as claimed in claim 1 wherein the photoconductive layer material is lead telluride.

8. A tube as claimed in claim 2 wherein the staggering is such that the holes are each midway between adjacent parts of the grid.

9. A tube as claimed in claim 3 wherein the holes in one layer are midway between the holes in the other.

References Cited in the file of this patent

UNITED STATES PATENTS

| | | |
|---|---|---|
| 2,258,294 | Lubszynski | Oct. 7, 1941 |
| 2,525,832 | Sheldon | Oct. 17, 1950 |
| 2,777,970 | Weimer | Jan. 15, 1957 |
| 2,898,489 | Weimer | Aug. 4, 1959 |
| 2,927,234 | Kazan | Mar. 1, 1960 |
| 2,945,973 | Anderson | July 19, 1960 |
| 2,963,604 | Weimer | Dec. 6, 1960 |

FOREIGN PATENTS

| | | |
|---|---|---|
| 115,873 | Australia | Sept. 15, 1942 |